(12) United States Patent
Kirkpatrick et al.

(10) Patent No.: US 7,296,297 B2
(45) Date of Patent: Nov. 13, 2007

(54) SYSTEM AND METHOD FOR USING WEB-BASED APPLICATIONS TO VALIDATE DATA WITH VALIDATION FUNCTIONS

(75) Inventors: Mark A. Kirkpatrick, Conyers, GA (US); Michael S. Bass, Lawrenceville, GA (US); Darin J. Morrow, Acworth, GA (US); John A. Strohmeyer, Norcross, GA (US); Mauricio Lopez, Atlanta, GA (US)

(73) Assignee: AT&T BLS Intellectual Property Corporation, Wilmington, DE (US)

( * ) Notice: Subject to any disclaimer, the term of this patent is extended or adjusted under 35 U.S.C. 154(b) by 724 days.

(21) Appl. No.: 09/995,648

(22) Filed: Nov. 29, 2001

(65) Prior Publication Data

US 2005/0005163 A1    Jan. 6, 2005

Related U.S. Application Data

(63) Continuation-in-part of application No. 09/916,330, filed on Jul. 30, 2001.

(51) Int. Cl.
| G06F 7/04 | (2006.01) |
| G06F 17/00 | (2006.01) |
| G06F 17/30 | (2006.01) |
| G06F 3/00 | (2006.01) |
| G06F 15/16 | (2006.01) |
| G06F 9/45 | (2006.01) |

(52) U.S. Cl. ............... 726/30; 707/7; 707/101; 719/316; 709/202; 709/246; 709/248; 715/508; 715/516; 715/517; 717/142

(58) Field of Classification Search ........... 713/200, 713/201; 707/7, 101; 726/30
See application file for complete search history.

(56) References Cited

U.S. PATENT DOCUMENTS

| 5,761,668 | A | * | 6/1998 | Adamchick | 707/101 |
| 5,813,017 | A | * | 9/1998 | Morris | 707/204 |
| 6,078,918 | A | * | 6/2000 | Allen et al. | 707/6 |
| 6,085,030 | A | * | 7/2000 | Whitehead et al. | 709/203 |
| 6,460,042 | B1 | * | 10/2002 | Hitchcock et al. | 707/10 |
| 6,629,098 | B2 | * | 9/2003 | McGeorge, Jr. | 707/6 |
| 6,654,932 | B1 | * | 11/2003 | Bahrs et al. | 715/507 |
| 6,665,662 | B1 | * | 12/2003 | Kirkwood et al. | 707/3 |
| 6,718,332 | B1 | * | 4/2004 | Sitaraman et al. | 707/102 |
| 6,816,864 | B2 | * | 11/2004 | Deuser et al. | 707/100 |
| 6,859,910 | B2 | * | 2/2005 | Croy | 715/513 |
| 7,000,236 | B2 | * | 2/2006 | Kirkpatrick et al. | 719/316 |
| 2001/0037361 | A1 | * | 11/2001 | Croy | 709/203 |
| 2001/0047279 | A1 | * | 11/2001 | Gargone | 705/1 |

* cited by examiner

*Primary Examiner*—Ayaz Sheikh
*Assistant Examiner*—Kaveh Abrishamkar
(74) *Attorney, Agent, or Firm*—Scott P. Zimmerman, PLLC; Geoff Sutcliffe; Jodi Hartman

(57) ABSTRACT

Clients using standard software protocols may access stored validation functions in order to perform validation functions on data via a number of methods including Internet applications, a Java RMI server, a CORBA gateway server and graphical screen interphase applications. The system allows for the efficient performance of validation services on data based on dynamically-maintained, centrally-stored validation functions.

22 Claims, 3 Drawing Sheets

SYSTEM AND METHOD FOR USING WEB-BASED APPLICATIONS TO VALIDATE DATA WITH VALIDATION FUNCTIONS

This application is a continuation-in-part of U.S. patent application Ser. No. 09/916,330, filed Jul. 30, 2001, which is hereby incorporated by reference herein in its entirety.

FIELD OF THE INVENTION

The present invention relates to an improved system and method for web-based applications to perform validation functions on data. More particularly, the present invention relates to a system and a method for allowing web users to execute hierarchical configurable data validation functions on data.

BACKGROUND OF THE INVENTION

Computer applications ("application servers") commonly require data to be validated prior to additional processing. Validation requirements are often dynamic. For example, validation requirements for a telephone service provider's software applications may change based on changed customer service availability, newly available or no longer available customer services, the number of customer requests in a given period, the acceptable times for requests, or the version of the software running.

In today's networked environment, application servers run a variety of different software protocols (e.g., J2EE Containers with CORBA orbs, J2EE Containers with RMI) and typically require a number of different data validations before performing other functions. As a result, a need exists for an application server that can dynamically maintain, process and efficiently run validations for a plurality of clients running different software protocols simultaneously.

Further, because validation needs often change, a need exists for a validation application server that can manipulate the validations run on specific fields of client validation requests without requiring extensive changes in software. Most computer software applications use configuration variables to alter their behavior without the need for regenerating code. This is most often done using text files. In today's Internet and networked environments this can cause administrative problems. This is largely because one software application may be running on several machines, in several locations. Thus, in order to alter the behavior of all of the copies of the software applications installed on all of the machines (i.e., in order to uniformly alter the behavior of all clients), the text files must access several files, often in several locations. This can be expensive and create significant administration problems. For one thing, security considerations often dictate that a text file employed to alter a software application must be on the same machine that is running the code. Therefore, the configuration file often must be replicated over several machines. If changes are made on one software application, they must also be made on all of the other applications. Errors can occur if the changes are not made consistently on all of the applications. Accordingly, a further need exists for an application server that will allow application server administrators to update the various validations done on fields of data without a new release of code.

Typically, in a web environment (including Internet, Intranet or Extranet), there are client-side applications and server-side applications. Accordingly, in a web-based environment, a further need exists for an improved system and method of performing validations on data submitted by web users with client-side applications.

SUMMARY OF THE INVENTION

The present invention is a system and method wherein an application server or web server using standard software protocols may access a centralized, maintainable, validation application server and/or a data schema in order to perform validation services on data.

Client servers may access a validation server via a number of methods including Internet applications, a Java RMI server, a CORBA gateway server and graphical screen interphase applications.

In other embodiments, web users may access stored validation functions via one or more web servers. The disclosed invention allows for the efficient performance of validation services on data based on dynamically-maintained, centrally-stored, validation functions, and preferably returns validation notifications to the client servers, in a web environment. By implementing embodiments of the disclosed invention, web users can validate data via web servers using client side methods such as Java and JavaScript code.

Web users can access validation rules stored in data schema using one or more Java Server Pages with Java code embedded in those pages.

DETAILED DESCRIPTION OF THE INVENTION

Figure 1:
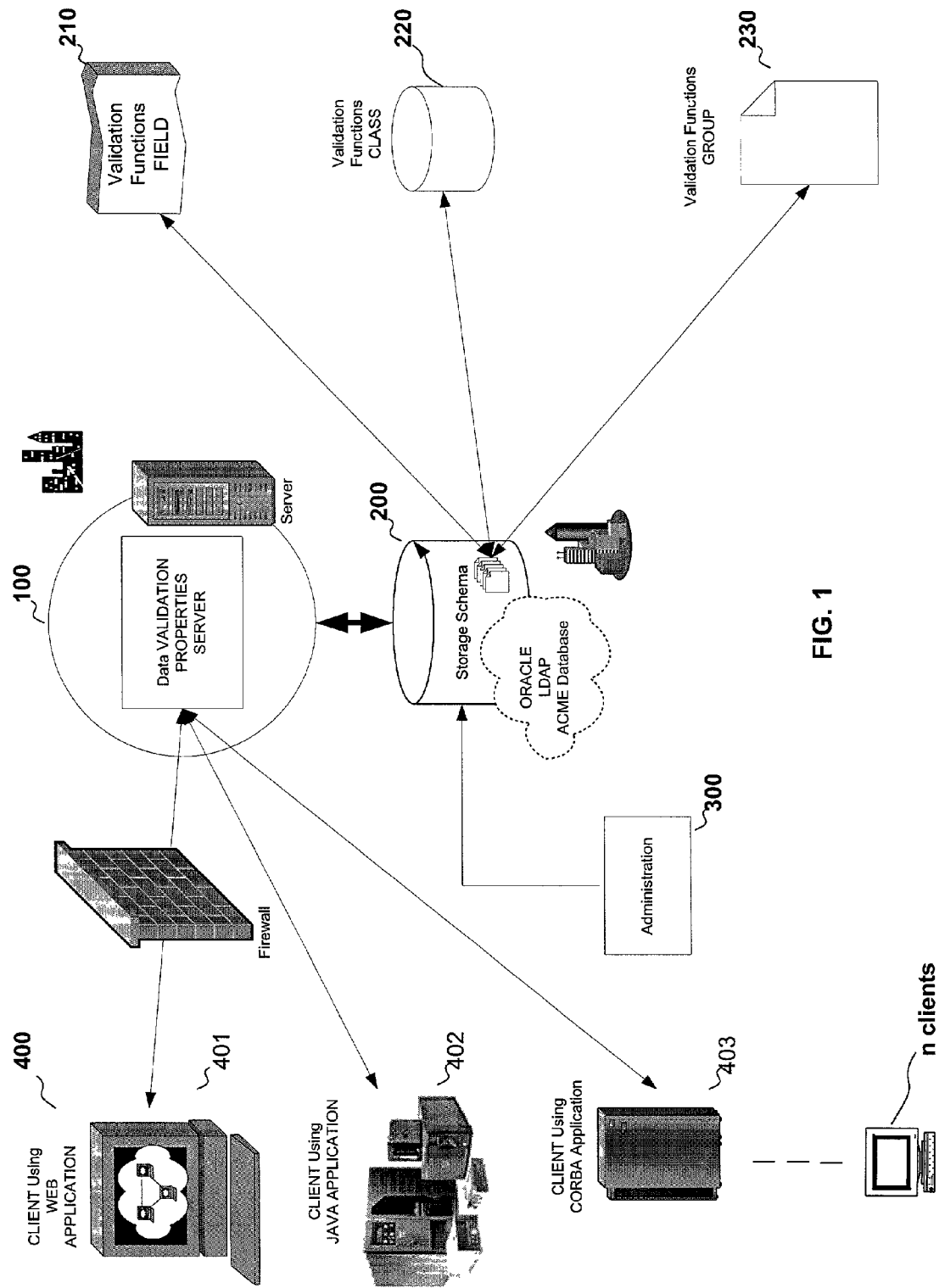
FIG. 1 is a schematic diagram of an overview of an embodiment of the present invention.

As shown in FIG. 1, for those embodiments directed at server-side applications, the present invention preferably includes an application properties server 100 for receiving validation requests from clients 400 and a storage mass 200 for storing centralized validation functions and data. As will be appreciated by those skilled in the art, one or more servers may represent validation properties application server 100, even if located in different geographic locations. In the preferred embodiment of the present invention, depending on system resources, a number n of clients 400 may access the validation application server 100 for validation service via a number of methods including, for example, clients 401 using Internet applications, clients 402 using Java via a Java RMI server (not shown), clients 403 using CORBA via a CORBA gateway server (not shown), and graphical screen interphase applications.

Figure 2:
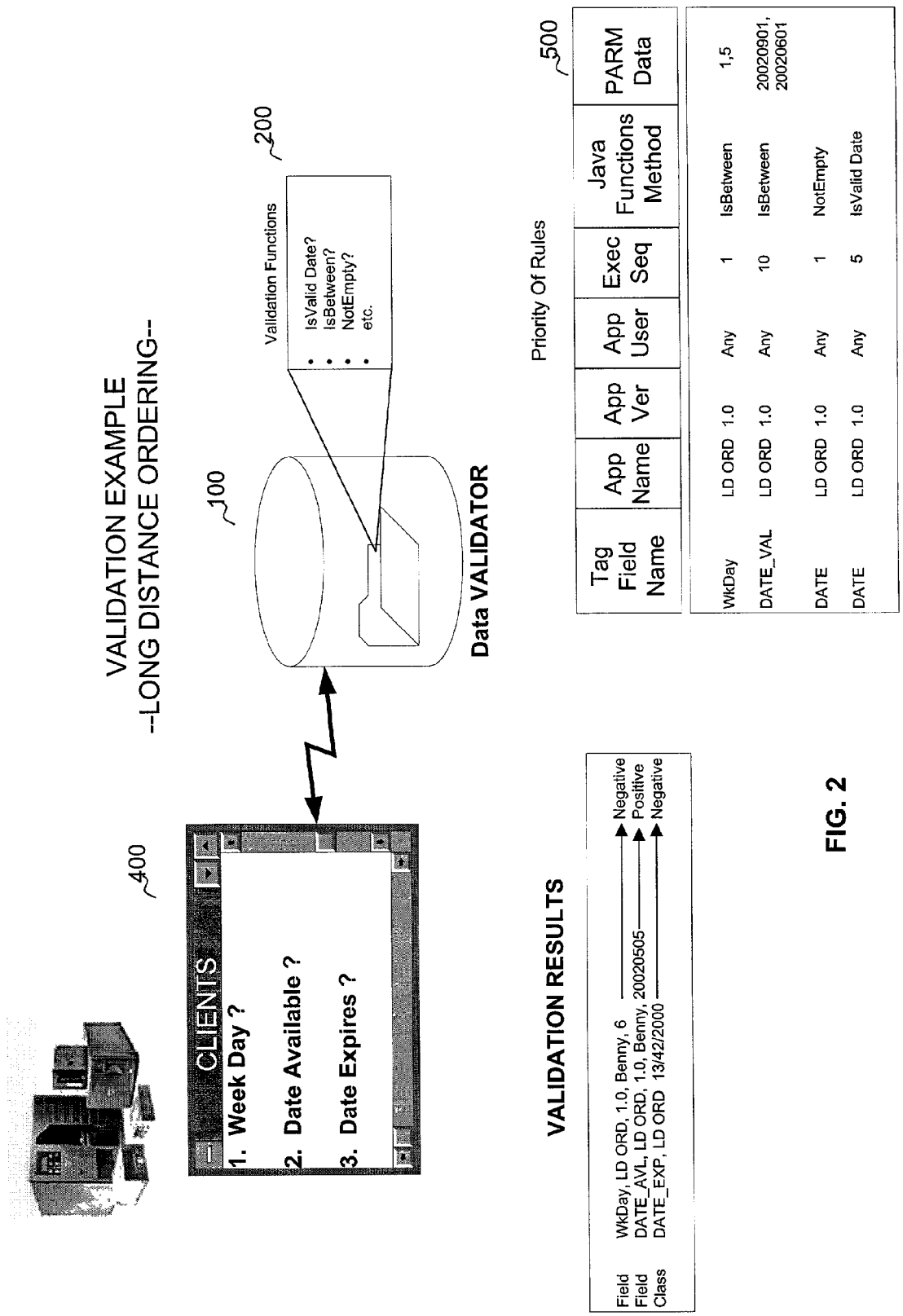
FIG. 2 is a schematic diagram illustrating a specific embodiment of the present invention.

Referring to FIG. 1, according to an embodiment of the present invention, clients serve validation requests to the application server 100 which then accesses storage mass 200 using a hierarchical rule-based system 500 (FIG. 2). The validation application server 100 identifies and accesses the stored data and performs validation services associated with the validation requests. Preferably tables of validation functions, or rules, implement the validation data, which may preferably be stored in a storage mass such as an ORACLE® database. As described below, by utilizing a table-based storage system, the application server of the present invention can efficiently and dynamically perform validation services on validation requests provided by a number n of clients.

Referring to FIG. 1, client 401 requests validated services related to data for, e.g., long distance ordering information such as valid installation dates, available installation dates, or the allowable number of telephones. Storage mass 200 contains a plurality of data tables 210, 220, 230, . . . that will be described below. In response to client 401's validation requests, validation properties server 100 provides validation services to client 401 by accessing storage mass 200. Similarly, and preferably at the same time, a client 402 running a Java application program can use RMI via an RMI interface to interact with properties server 100 and provides validation services based on information stored in storage mass 200. Finally, a third client, running a CORBA application 403 may request validation service on data related to, for example, Wireless Ordering. Again, validation properties server 100 accesses storage mass 200 and performs a validation service for client 403.

The validation data may be stored in a format such as ORACLE® or Lightweight Directory Access Protocol ("LDAP"). The information may be stored in another location or may be shared with other businesses. Preferably, validation data is stored in a table based system, more preferably in an ORACLE® database 200. As will be appreciated by those skilled in the art, use of an ORACLE® database allows for good performance, data integrity, and a wide variety of data management tools to administer the configuration data via an administration system 300. As will also be appreciated by those skilled in the art, ORACLE® database 200 may be represented by two or more databases located in separate geographical locations.

FIG. 2 depicts a more specific embodiment and example of the present invention as it relates to server-side applications. Database 200 consists of a table-based system of rules organized into three hierarchically organized views: FIELD, CLASS and GLOBAL. The three views allow hierarchical management of the validation service(s) to be performed on data fields received from the client 400 server. In the preferred embodiment, the three views are FIELD, CLASS and GLOBAL in order of precedence. Of course, the number of views may vary depending on, for example, a client's needs.

In this embodiment, each of the FIELD, CLASS and GLOBAL views has an execution sequence. Utilizing an execution sequence provides a layered approach. According to the execution sequence for a particular view, validation methods (services) can be executed on data in order.

Before providing a specific example, the FIELD, CLASS and GLOBAL views are explained in more detail below. In the preferred embodiment, the FIELD view is the highest priority validation. Preferably, the least amount of data is sorted by the FIELD view. If a FIELD name for the associated application is in this table that entry will dictate the validations to be performed.

As an example of one embodiment of the present invention, referring to Table 1, the FIELD view contains the following data:

TABLE 1

| Column Name | Description |
| --- | --- |
| Tag Name | Name of data field used to locate validations |
| Application Name | Application tag to differentiate field names from those in other applications. |
| Application Version | Application tag to differentiate field names from those in other versions of the same application. |

TABLE 1-continued

| Column Name | Description |
| --- | --- |
| Application User | Application tag to differentiate field names from those in other instances of an application and version for different users. |
| Execution Sequence | A number designating the order of execution for the 1 or more validation methods for an item meeting the previous criteria. |
| Validation Method | The name of an existing Java method to be called with the value of the field to be validated. |
| Validation Values ("PARM Data") | Used by the validation method to compare to the data value. Presence determined by validation method. Items are separated by a predefined character (generally a ",") (e.g., 1,5; 20020901, 20020601) |
| Comment | Description of desired rule. Used for documentation only. |

In the preferred embodiment, the CLASS view is the second-highest priority validation. The CLASS view is used if there is no matching entry in the FIELD view. In such a case, a lookup will be performed by the validation application server 100 on the passed field name. For example, the validation application server 100 will perform a check for class names that match the first part of the field name. An illustrative example is discussed below to describe the FIELD view and CLASS view hierarchy.

EXAMPLE 1

No Address_Data

A client application server 400 accesses the validation application server 100 with data tagged with a field name of Address_1. However, there is no Address_1 item in the FIELD view. There is, however, an entry in the CLASS view for Address. Therefore the validation functions for the CLASS view Address will be performed on the data in Address_1.

As an example of one embodiment of the present invention, referring to Table 2, the CLASS view contains the following data:

TABLE 2

| Column Name | Description |
| --- | --- |
| Tag Name | A generic string that will be used to match the field's name up to a defined character. (Date_1 will match up with Date) |
| Application Name | Application tag to differentiate field names from those in other applications |
| Application Version | Application tag to differentiate field names from those in other versions of the same application. |
| Application User | Application tag to differentiate field names from those in other instances of an application and version for different users. |
| Execution Sequence | A number designating the order of execution for the one or more validation methods for an item meeting the previous criteria. |
| Validation Method | The name of an existing Java method to be called with the value of the field to be validated. |
| Validation Value 1 ("PARM Data") | Used by the validation method to compare to the data value. Presence determined by validation method. Items are separated by a predefined character (generally a ",") |

TABLE 2-continued

| Column Name | Description |
| --- | --- |
| Comment | Description of desired rule. Used for documentation only. |

| Tag Name | Application Name | Application Version | Application User | Execution Sequence | Validation Method | Validation Value 1 |
| --- | --- | --- | --- | --- | --- | --- |
| Date | Appl1 | 001 | EMRS1 | 10 | IsBetween | Jan. 01, 2000, Dec. 31, 2002 |
| Date | Appl1 | 001 | EMRS1 | 1 | NotEmpty | |
| Date | Appl1 | 001 | EMRS1 | 5 | IsValidDate | |

Finally, in the preferred embodiment, the GLOBAL view is the most generic method of performing validation functions. Any field that does not have an entry in either the FIELD or CLASS view will be validated with the methods dictated for the associated application information. As this view is generic, preferably the most data is handled at the GLOBAL level, thereby improving efficiency. An example is discussed below describing the hierachry between the FIELD, CLASS and GLOBAL views.

EXAMPLE 2

The Field Name is Residence_2

There is no Residence_2 item in the FIELD view. There is no Residence entry in the CLASS view. There is, however, a GLOBAL validation function called NotEmpty in the GLOBAL table for the application 400 (name, version and user) that requires data validation. Therefore the data for Residence_2 will be checked to see if it is not an empty field and validation properties server 100 will provide a positive return to client 400.

In the preferred embodiment, each of the FIELD, CLASS and GLOBAL views has an execution sequence for the associated validation functions that exist for that view. This provides a layered approach to validation. An example for describing the execution sequence is described below.

EXAMPLE 3

Field Name: Date_1
The FIELD table is as follows:

In this example, based on the Execution Sequence of "1", the date is first checked for a non-empty field by validation method "NotEmpty." If it passes, based on the next rule, which has an execution sequence of "5", the date will be checked to see if it is a valid date format—using the IsValidDate method. If the date data passes that method, the date will be checked to make sure it is between Jan. 1, 2000 and Dec. 31, 2002 with the IsBetween method based on the Validation Value 1 PARM data in the CLASS view table. If the date data passes, then the data will be considered valid and the server 1 00 will return a positive return to the requesting client application server 400 signifying valid data. This example illustrates a "CLASS" level validation.

FIG. 2 depicts an exemplary embodiment of a server-side application in accordance with the present invention. In this example, client application server Long Distance Delivery Ordering ("LD ORD") 400 seeks to validate data input by a customer for the weekday, the date available and the date of expiration related to a desired telephone service. Using a known software application protocol, application server 400 sends validation requests related to the data input by the customer to the validation application server 100. In this example, the weekday data is tag named "WkDay." Accordingly, the validation application server 100 generates an instruction to call the FIELD view table from the storage medium 200 for WkDay. In this example, the application server 100 automatically follows a priority of rules 500. Here, there is only one rule, i.e., one Java Function, for

| Tag Name | Application Name | Application Version | Application User | Execution Sequence | Validation Method | Validation Values |
| --- | --- | --- | --- | --- | --- | --- |
| ClassOfService | Appl1 | 001 | EMRS1 | 1 | IsMember | 0, 1, 2, 3, 4, 5, 6, 7, 8, 9, 0, A, F |
| DayOfWeek | Appl1 | 001 | EMRS1 | 1 | IsBetween | 1, 5 |

In this illustrative example, there is no match for Field Name: Date_1 in the FIELD view. Here, there are only validation executions in the FIELD view table for ClassOfService and DayOfWeek. However, the validation properties server 100 recognizes that the CLASS view table has a matching item called Date. The CLASS view table has three entries (i.e., three validation methods) to be performed. The CLASS view table is as follows:

WkDay. As shown in FIG. 2, the Java method associated with the WkDay rule is an IsBetween method. Accordingly, the validation server 100 checks to see if the input data is between 1 and 5 based on the PARM data. If the data is between 1 and 5, the validation server 100 returns a positive indication to client 400. If the input data is not between 1 and 5, the validation server 100 returns a negative indication to client 400.

Next, according to the example depicted in FIG. 2, the validation server 100 performs validation service on validation requests for the data input for date available, which has been tagged DATE_VAL. Here, database 200 includes one rule in the FIELD view for data tagged DATE_VAL. Accordingly, validation server 100 performs a Java-based IsBetween function on the input data tagged DATE_VAL to check if the data is between Jun. 1, 2002 and Sep. 1, 2002. Here again, server 100 provides an appropriate response to client 400. In other embodiments, further services may be provided in response to a positive, or negative, result, such as additional data validations, or the generation of further functions.

Referring again to FIG. 2, next, LD ORD 400 requests validation service on data related to the date of expiration for the requested telephone service. This data has been tagged DATE_EXP. The priority of rules 500 indicates that there are no rules in the FIELD view, i.e., there are no validation functions, for DATE_EXP. Therefore, the validation application server 100 looks to the next level of rules: the CLASS view. Referring to the exemplary rules table 500, there are two rules in the CLASS view for DATE: NotEmpty and IsValidDate. Accordingly, the application server 100 will read the execution sequences to determine which Java function to perform first. Java function NotEmpty has an execution sequence of "1" and Java function IsValidDate has an execution sequence of "5". Based on this sequence of execution set forth in the CLASS view, the validation server 100 executes first the NotEmpty function and then the IsValidDate function on the data. As will be appreciated by those skilled in the art, in this example, if there were no DATE rules, validation application server 100 would look for GLOBAL rules in the GLOBAL-view table. In the preferred embodiment, at least a NotEmpty validation function exists for the GLOBAL rules.

As will also be appreciated, by utilizing a centrally located storage system of dynamically maintainable validation rules, the present invention provides greater flexibility than known systems. For example, in the exemplary example discussed above, system administration 300 (FIG. 1) can update the PARM data for the DATE_VAL rule and, accordingly, all applications 400 requesting validation services for data related to DATE_VAL are immediately updated.

In some instances, the number of validation requests may be large depending on the number n of application clients 400 using the server 100. Constant database 200 reads may cause delays in validation service. Therefore, in one exemplary embodiment, the validation server 100 will read the database 200 data 500 into memory on startup. Updates to the validation rules and values stored in the data tables can occur after system start up.

Two exemplary methods to handle dynamic table updates are described below. The first method is to restart the validation application server 100 each night during a maintenance window. This approach is a simple restart of the validation server. The application itself would not have to restart since it could detect the lost connection to the validation server and reconnect. This would be seamless to the applications and end user of the applications. Another exemplary method involves creating a refresh function in the validation server 100. Preferably the server 100 will use a REFRESH_HOURS parameter. The memory tables will be updated from the database 200 based on this parameter. Preferably, the REFRESH_HOURS will be greater than 8. As will be appreciated, keeping the data 500 in the application server 100 memory will improve validation performance and allow or maintaining the dynamic nature of the validation routines.

The most generic field type in Java is the string. In the preferred embodiment, all data passed to the validation server 100 will be treated as a string. This will allow applications 400 to change to more generic data without impact. This embodiment will provide an interface that is as generic as possible by establishing the interface as Strings (ASCII). An example of this concept is set forth below.

As an example, assume that a business requirement was originally for an integer value for the Class of Service variable. However, since the integer values can be type cast to String and passed to the validation server 100, modifications to the rules can be made quickly. Modifications to types would cause the validation server 100 to understand application knowledge and not data values and validation rules. Testing with the legacy system determines that the value of NumberOfTelephoneLines may also be a single alpha character in some legacy systems. According to the present invention, since the variable is stored as a string the client code is not affected. Accordingly, the validation functions in the data table can be changed to an IsMember method instead of an IsBetween method. The validation value data will include all possible valid data values. This will change the validation from a check between two integer values (e.g., a number between 1 and 5) to a check for a member of the a set (e.g., 1,2,3,4,5,A,T,Y). This could be done without disturbing the running applications that utilize this validation service.

Proposed ValidatorClient CLASS methods include:

TABLE 3

| Method | Return Type | Arguments | Description |
| --- | --- | --- | --- |
| ValidatorClient | ValidatorClient | Application Name, Application Version, Application User | Class constructor. Also used to initialize Application data for subsequent calls |
| ValidatorClient ~ValidatorClient | ValidatorClient ~ValidatorClient | | Class constructor. Class destructor |
| set | | Application Name, Application Version, Application User | Sets application data settings for the object. |
| isValid | Boolean | Field Name, Field Value | Sends data to the validator server for work. If the data passes the rules a TRUE is returned. Otherwise; a FALSE is returned. |
| IsValid | VRHashTable | FVHashTable | Sends data to the validator server for work. If the data passes the rules a TRUE is returned. Otherwise; a FALSE is returned. |
| RuleType | Integer | Field Name | Gets the rule type used for validation - 0 = None, |

TABLE 3-continued

| Method | Return Type | Arguments | Description |
|---|---|---|---|
| | | | 1 = Field, 2 = Class, 3 = Global {Used primarily for development} |

In one embodiment, the client servers 400 can minimize network traffic using Field Value Hashtables. As will be appreciated, this will reduce the number of transactions to the validation application server 100 and improve performance. One call to the server 100 can contain an entire set of data in need of validation. The individual validation statuses will also be returned in a Hashtable. Preferably, the IsValid method is used to determine if all the data passed validation. If not, individual methods can be checked to determine problem areas.

Proposed FVHashTable CLASS methods include:

TABLE 4

| Method | Return Type | Arguments | Description |
|---|---|---|---|
| FVHashTable | FVHashTable | | Constructor for a Field Value HashTable object. |
| AddToSet | Boolean | Field Name, Field Value | Add a field value pair to the FVHashTable. Return True on success. |
| RemoveFromSet | Boolean | Field Name | Remove a field value pair from the FVHashTable. Return True on success. |
| MemberValue | String | Field Name | Return the value of the specified key. |

Proposed VRHashTable CLASS methods:

TABLE 5

| Method | Return Type | Arguments | Description |
|---|---|---|---|
| VRHashTable | VRHashTable | | Constructor for a Value Return Hash Table object. |
| AddToSet | Boolean | String Field Name, Boolean Valid | Add a field value pair to the VRHashTable. Return True on success. |
| RemoveFromSet | Boolean | String Field Name, | Remove a field value pair from the VRHashTable. Return True on success. |
| MemberValue | Boolean | Field Name | Return the validation status value of the specified key. |
| IsValid | Boolean | | Returns a True if all values for the set are True. Otherwise; returns a False. |

Figure 3A:
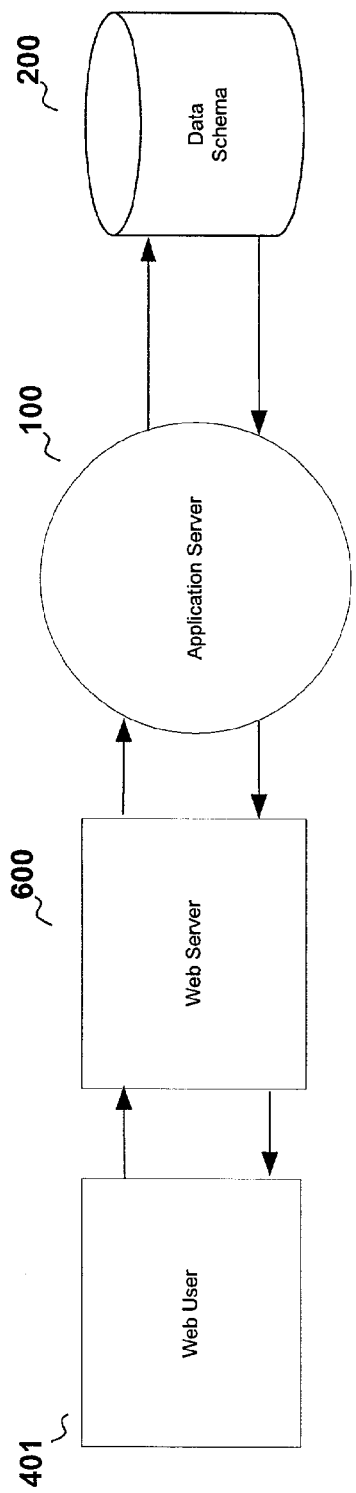
FIGS. 3A and 3B are diagrams illustrating embodiments of the present invention that include web server applications.
Figure 3B:
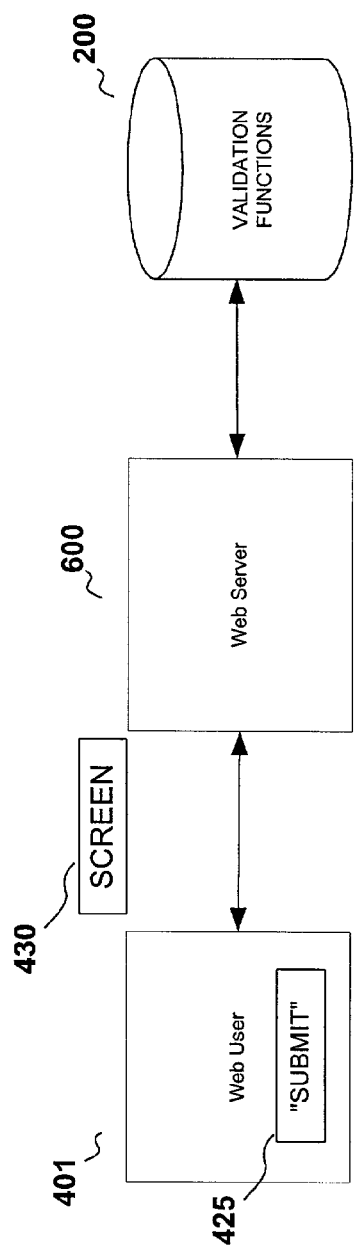

Referring to FIGS. 3A and 3B, further exemplary embodiments related to web-based applications of the present invention will now be described. As shown in FIG. 3A, a web user 401 may access data schema 200 via application server 100 by using the methods discussed above. Alternatively, in a web environment, as shown in FIG. 3B, web user(s) (i.e., web applications) 401 may validate data via web server(s) 600 using client side methods such as Java and JavaScript code. As will be explained below in further detail, web user 401 can access validation rules stored in data schema 200 using one or more Java Server Pages ("JSP") with Java code embedded in those pages.

As will be appreciated by those skilled in the art(s), the JSP code will have calls to Java servlet methods. These Java servlet methods are compiled into byte code class files when web server 600 is started. Preferably, the first method called will be getValidationSet(|String ApplicationName, String ApplicationVersion, String ApplicationUser|). This method will retrieve matching records for this application 401 from the database 200 and store them in local memory, such as in an array. This will keep the information from the database in local memory as long as the web server 600 keeps the JSP compiled. Therefore, it will not be necessary to go to the database 200 each time this server page is accessed. Web servers 600 normally recompile JSP code when they are restarted. They sometimes reload them when they see that the source has been modified. They also recompile them when the class file is deleted. The data from the web form will be modified when the user signals that screen entry is complete. Typically, a user 401 clicks a "submit" 425 button to do this. The submit 425 is an event button on the web browser screen 430 that indicates the user 401 is finished entering data into the web form. This event will signal the JSP code that the data has been entered and is ready for validation.

The typical Java method used will be doValidation(String tag, String value). This method will look in the local array to find rules that apply to the given tag. These rules are determined in the hierarchical manner as previously described. The data passed in the value variable will be validated according to those rules. Preferably, the success or failure of the validation will be returned by the return code of the doValidation method. Preferably, this is all done in local code. No further calls to the validation server database are required. In the preferred embodiment, this will be done for each field specified by the code in the JSP.

It is also possible to perform validation services while data is being entered in the data form. This will require JavaScript code in the JSP. JavaScript provides methods to web forms, making them more interactive. Limited intelligence can be provided by the Java running in the browser. The form does not have to be pushed to the web server 600 for form processing. This is typically done with onUpdate calls that trigger each time data in a field changes. This event could call the doValidation method if the JSP chooses.

FIG. 3B depicts a preferred embodiment of this architecture, wherein at least one JSP containing Java files will be compiled into class files at the first instance that it is executed. Referring to FIG. 3B, web user 401 calls a JSP and web server 600 reads validation information from data schema 200 to understand the validation behavior that it should run in the application. Common Java methods are used to load validation rules into objects that can be used by the JSP. Web server 600 puts the appropriate code in place, using, for example, known Java methods such as the "init" function. Accordingly, data validation rules are configured in the memory of a running program and Java files are converted into class files when they are called by web server 600. In particular, the submit function 425 of the form will go through a Java method to perform the necessary JavaScript functions. Accordingly, these functions will be included into the JSP from a common library of JavaScript validation functions. As will be appreciated, by using this method the JSP will reflect the most recent validation behavior dictated by the validation rules in the data schema 200. This behavior will direct the JavaScript functions and order of execution for each data field using similar validation hierarchy architecture as that explained above. Implementing embodiments of this architecture provides improved performance for performing data validation services in a web-based environment. For example, by using embodiments of this architecture, fewer accesses to data schema 200 are required. Validation functions will be stored inside the memory of the running program. Accordingly, when web user 401 executes a program, the validation functions are already in memory. The required validation behavior will be dictated on the initial compilation load of the class.

As will be appreciated, screen 430 in HTML format contains the contents of the web browser's display buffer. This could include one or more frames. Any frame can contain a form. A form as used herein refers to a data entry form that captures user 401 data input. As explained above, using embodiments of the invention, if the web page contains JavaScript, validations and other data services can be done locally. Otherwise, the form processing is done by the web server on a "submit" 425 event.

As will be appreciated by those skilled in the art, changes in the validation rules will not be implemented until a JSP is recompiled. This event can be triggered by a number of methods. The methods vary by web server 600. A Java file will be recompiled into a class file when, for example, the web server starts, the Java source file is updated, or the class file is deleted by an outside cause. A web administrator can initiate recompiling and reloading by deleting class files. Class files may be deleted so that the web server 600 senses the need to recompile. Accordingly, changes can be made in the validation rules compiled in the web application. Subsequently, the web server's 600 validation behavior may be altered the next time the server 600 compiles the Java pages and reads information from the data schema 200.

As will be appreciated, according to the embodiments discussed above, two devices that are coupled can engage in direct communications, in indirect communications or a combination thereof. Embodiments of the present invention relate to data communications via one or more networks. The data communications can be carried by one or more communications channels of the one or more networks. Examples of a network include a Wide Area Network (WAN), a Local Area Network (LAN), the Internet, a wireless network, a wired network, a connection-oriented network, a packet network, an Internet Protocol (IP) network, or a combination thereof. A network can include wired communication links (e.g., coaxial cable, copper wires, optical fibers, and so on), wireless communication links (e.g., satellite communication links, terrestrial wireless communication links, wireless LANs, and so on), or a combination thereof.

In accordance with an embodiment of the present invention, instructions adapted to be executed by a processor to perform a method are stored on a computer-readable medium. The computer-readable medium can be a device that stores digital information. For example, a computer-readable medium includes a hard disk, a floppy disk, a tape and a compact disc read-only memory (CD-ROM), all as known in the art for storing software. The computer-readable medium is accessed by a processor suitable for executing instructions adapted to be executed. The term "adapted to be executed" is meant to encompass any instructions that are ready to be executed in their present form (e.g., machine code) by a processor, or require further validation (e.g., compilation, decryption, or provided with an access code, etc.) to be ready to be executed by a processor.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A client-server computer system for use with web-based applications comprising:

a client computer system running one or more web browsers capable of processing web forms;

a web server communicating with the client computer system and providing validation services, the web server capable of processing Java code and web-based forms, the web server receiving a validation request from the client computer system that comprises data fields for validation;

a storage mechanism coupled to said web server, the web server validating the data fields with information compiled from said storage mechanism;

tables of validation rules stored in said storage mechanism, the validation rules changing the data fields to be validated from ASCII character strings, the validation rules also changing a validation function from checking between two integer values to checking for membership in a set, the validation rules comprising at least three hierarchically organized views, with each view utilizing an execution sequence of validation methods, the execution sequence designating an order of execution for the validation methods, and when a view has no validation rules, then a lower priority view's execution sequence is performed, the validation rules having a FIELD view as a highest priority such that a least amount of data fields are sorted by the FIELD view, and when a FIELD name occurs in a table, then the highest priority validation is performed; and the web server comparing the data fields to be validated to the validation rules, wherein each validation method compares validation values to the data fields.

2. A client-server computer system according to claim 1, wherein the tables of validation rules utilize a CLASS view as a second-highest priority validation, the CLASS view used when there is no matching entry in the FIELD view, the tables of validation rules performing a check for class names that match a first part of the field name.

3. A client-server computer system according to claim 1, wherein the tables of validation rules type cast a single value integer, and when any data field does not have an entry in the FIELD and the CLASS view, the tables of validation rules using a generic GLOBAL view.

4. A client-server computer system according to claim 1, wherein the validation rules type cast an integer as a string.

5. A client-server computer system according to claim 1, wherein the validation rules change legacy data to the ACSII character string.

6. A client-server computer system according to claim 5, wherein the validation rules change the legacy data to check for membership in a data set of ASCII character strings.

7. A client-server computer system according to claim 1, wherein the validation rules validate an entire set of data.

8. A client-server computer system according to claim 7, wherein the validation rules return individual validation statuses in a hash table.

9. A client-server computer system according to claim 1, wherein said validation rules validate weekday, date available, and date of expiration for long distance telephone service.

10. A client-server computer system according to claim 1, wherein each validation rule includes an associated application tag that differentiates versions of an application.

11. A client-server computer system according to claim 1, wherein each validation rule includes an associated application tag that differentiates instances of an application and version for different users.

12. A web server system comprising:
at least one web application;
means for performing validation service on data fields submitted by said at least one web application;
means for processing web forms;
means for storing and retrieving tables of validation rules stored in a storage mechanism, the validation rules changing the data fields to be validated to ASCII character strings, the validation rules also changing a validation function from checking between two integer values to checking for membership in a set, the validation rules comprising at least three hierarchically organized views, with each view utilizing an execution sequence of validation methods, the execution sequence designating an order of execution for the validation methods, and when a view has no validation rules, then a lower priority view's execution sequence is performed, the validation rules having a FIELD view as a highest priority validation such that a least amount of the data fields are sorted by the FIELD view, and when a FIELD name occurs in a table, then the highest priority validation is performed;
wherein each validation method compares validation values to the data fields; and
means for compiling the validation rules into said at least one web application in order to perform said validation service.

13. A web server system according to claim 12, wherein the tables of validation rules utilize a CLASS view as a second-highest priority validation, the CLASS view used when there is no matching entry in the FIELD view, the tables of validation rules performing a check for class names that match a first part of the field name.

14. A web server system according to claim 12, wherein the tables of validation rules type cast a single value integer, and when any data field does not have an entry in the FIELD and the CLASS view, the tables of validation rules using a generic GLOBAL view.

15. A web server system according to claim 12, wherein said validation rules type cast an integer as a string.

16. A web server system according to claim 12, wherein the validation rules change legacy data to the ASCII character string values.

17. A web server system according to claim 16, wherein the validation rules change the legacy data to check for membership in a data set of ASCII character strings.

18. A web server system according to claim 12, wherein the validiation rules validate an entire set of data.

19. A web server system according to claim 18, wherein the validation rules return individual validation statuses in a hash table.

20. A web server system according to claim 12, wherein the validation rules validate weekday, date available, and date of expiration for long distance telephone service.

21. A web server system according to claim 12, wherein each validation rule includes an associated application tag that differentiates instances of an application and version for different users.

22. A computer-readable media with instructions executable by a processor for providing a validation application service for web-based applications, the media comprising instructions to:
couple a service request from a data device to a web server, the request including data to be validated;
generate a service session instruction, the service session instruction based at least in part on the service request;
sent the service session instruction to one or more web servers, the service session instruction corresponding to one or more data validation requests from said customer data device;
compile at least one page based on stored validation rules in a database, the validation rules changing the data to be validated to ASCII character strings, the validation rules also changing a validation function from checking between two integer values to checking for membership in a set, the validation rules comprising at least three hierarchically organized views, with each view utilizing an execution sequence of validation methods, the execution sequence designating an order of execution for the validation methods, and when a view has no validation rules, then a lower priority view's execution sequence is performed, the validation rules having a FIELD view as a highest priority validation such that a least amount of the data fields are sorted by the FIELD view, and when a FIELD name occurs in a table, then the highest priority validation is performed; and
send a validation service response to the data device, wherein the validation service response is based on the service request.

* * * * *